June 2, 1925.                                                    1,540,644
L. C. MAMAUX
CHAIN HOLDER AND APPLIER
Filed Dec. 31, 1923        4 Sheets-Sheet 1

LEON C. MAMAUX   INVENTOR
BY *Victor J. Evans*
ATTORNEY

June 2, 1925. 1,540,644

L. C. MAMAUX

CHAIN HOLDER AND APPLIER

Filed Dec. 31, 1923 4 Sheets-Sheet 2

LEON C. MAMAUX INVENTOR

BY *Victor J. Evans*

ATTORNEY

June 2, 1925.

L. C. MAMAUX

CHAIN HOLDER AND APPLIER

Filed Dec. 31, 1923 4 Sheets-Sheet 3

1,540,644

LEON C. MAMAUX INVENTOR

BY Victor J. Evans

ATTORNEY

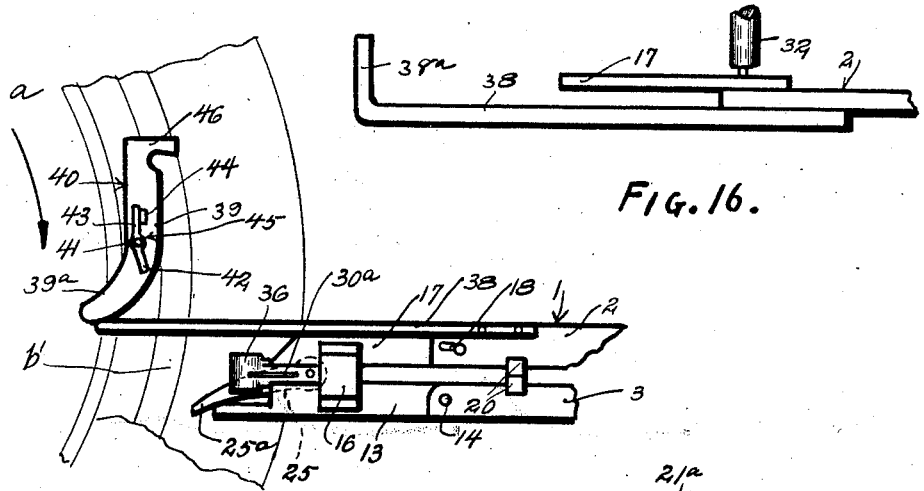
Fig. 16.
Fig. 14.
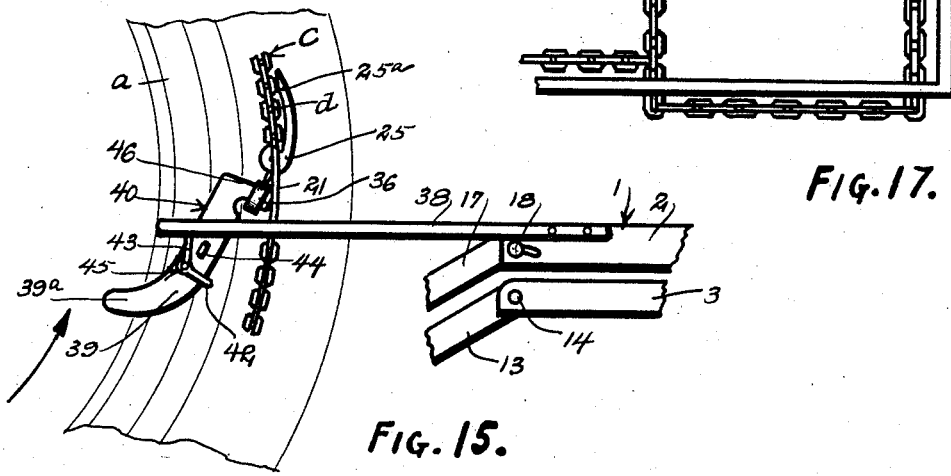
Fig. 17.
Fig. 15.

Patented June 2, 1925.

1,540,644

UNITED STATES PATENT OFFICE.

LEON C. MAMAUX, OF WILKINSBURG, PENNSYLVANIA.

CHAIN HOLDER AND APPLIER.

Application filed December 31, 1923. Serial No. 683,805.

*To all whom it may concern:*

Be it known that I, LEON C. MAMAUX, a citizen of the United States, residing at Wilkinsburg, in the county of Allegheny and State of Pennsylvania, have invented new and useful Improvements in Chain Holders and Appliers, of which the following is a specification.

This invention relates to means for applying chains to automobile wheels, and more particularly to what I term a chain holder and applier.

One of the main objects of the invention is to provide means of simple and efficient construction and operation whereby anti-skid chains may be readily applied to automobile wheels during travel of the automobile. A further object is to provide means of this character which will act to support the chains in extended position, when not in use, this means being of very simple and inexpensive construction. A further object is to provide simple and efficient means which co-operates with the chain supporting means for securing the ends of the chain when it has been applied about the wheel. Further objects will appear from the detail description.

In the drawings:—

Figure 14 is a fragmentary side view of a modified form of the device;

Figure 15 is a similar view illustrating the manner of releasing the chain from the wheel after it has been applied;

Figure 16 is a fragmentary top plan view of the chain receiving and supporting frame illustrated in Figure 14 showing the trip arm;

Figure 17 is a fragmentary top plan view of a modified form of chain and of the forward end portion of the casing.

Figure 1:
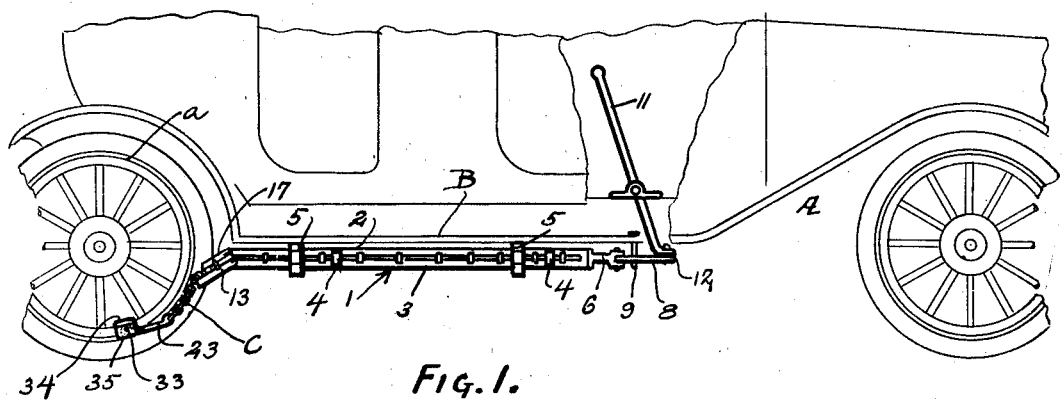
Figure 1 is a side view of the chain holding and applying means as used.
Figure 2:
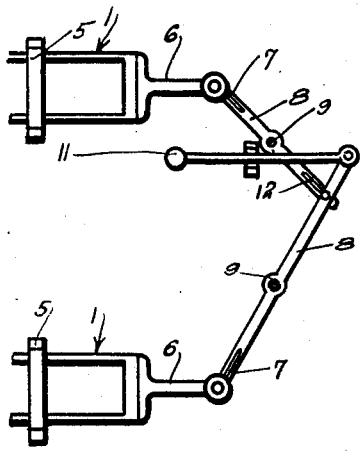
Figure 2 is a plan view of the lever arrangement for adjusting the chain holding frames.
Figure 3:
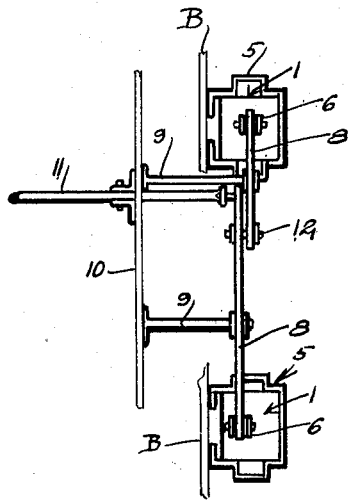
Figure 3 is a front view of the lever arrangement illustrated in Figure 2.

At each side of the automobile A I provide a chain receiving and supporting frame 1 composed of upper and lower sections 2 and 3, respectively, each of these sections being of substantially elongated U-shape. Sections 2 and 3 are secured together in spaced relation by means of brace strips 4. Frame 1 is suspended from the under face of running board B of the automobile by means of suitably shaped suspending brackets 5, the frame being slidably mounted in these brackets for movement toward and away from rear wheel $a$ of the automobile. A rod 6 extends from the front of each frame 1 and is connected by pin and slot connections 7 to one arm of a lever 8 which is rockably mounted on the lower end of a bracket 9 depending from floor 10 of the automobile. An operating lever 11 is rockably mounted on the floor of the automobile and the lower end of this lever is connected to the inner end of one of the levers 8 which is extended for this purpose and overlaps the other lever 8, the inner ends of the levers 8 being connected by pin and slot connections 12. By rocking lever 11 in proper direction the frames 1 may be moved toward or away from the rear wheels $a$ of the automobile, as will be evident. While the arrangement of levers illustrated and described provides simple and efficient means for adjusting the frames 1, any other suitable or preferred arrangement can be employed for this purpose.

A trip member 13 is pivoted at its forward end, at 14, to the rearward end of each side rail of lower section 3 of frame 1. This member is reduced in width, at its forward portion, and is bent back upon itself and secured to form an elongated loop 15.

Figures 12, 13:
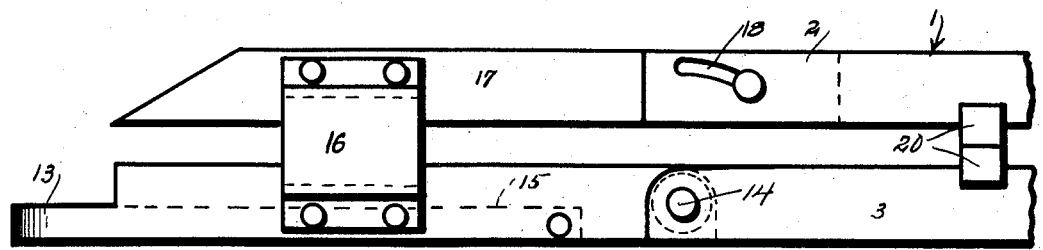
Figure 12 is a similar view showing the hinged guide section of the frame depressed.
Figure 13 is an end view of the wheel clip as applied.

Member 13 is connected by means of a spacing and brace strip 16 to an upper member 17 connected at its forward end by pin and slot connections 18 to the rearward end of the side rail of member or section 2 of frame 1, the slot of the pin and slot connection 18 being disposed concentric with pivot 14 of member 13. By this construction the members 13 and 17 form a chain discharge and guide member which may be tilted as illustrated in Figure 12 for feeding the chain onto the automobile wheel.

Figure 4:
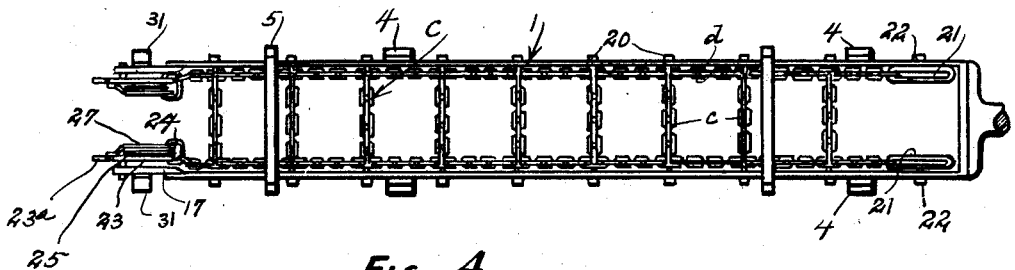
Figure 4 is a top plan view of one of the chain holding frames with the chain in position.
Figure 8:
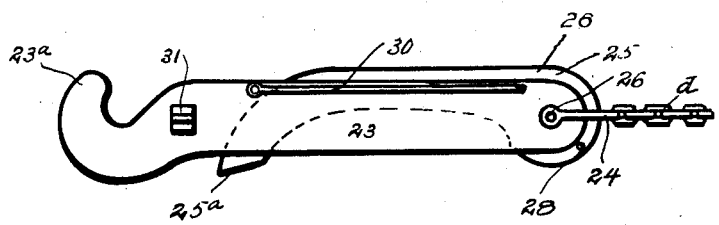
Figure 8 is a side view of the hook.
Figure 9:
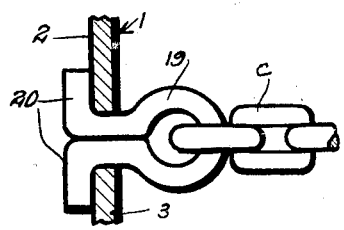
Figure 9 is a fragmentary section through the chain supporting frame showing one of the chain supporting and guide members.
Figure 10:
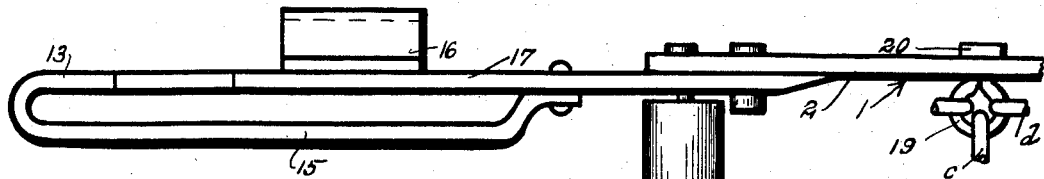
Figure 10 is a fragmentary top plan view of the rearward end portion of the lower section of one of the chain receiving frames.
Figure 11:
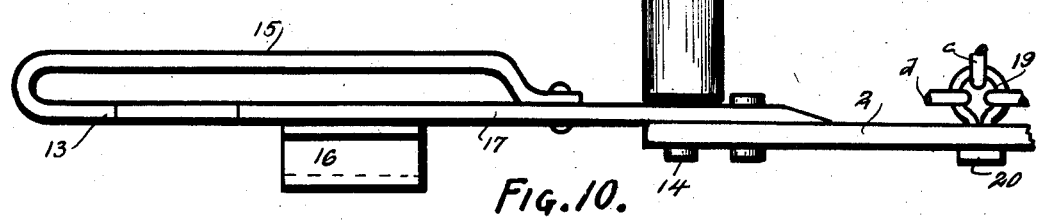
Figure 11 is a fragmentary side view of the rearward end portion of one of the chain receiving frames.

Casing 1 is adapted to receive a chain C of any suitable or preferred construction, the cross-chains c of chain C being provided, at each end, with a guide member 19 which projects through the slot between the rails of sections 2 and 3 of frame 1, the outer end portions of this member being bent at right angles to provide retaining fingers 20. The members 19 provide simple and efficient means for slidably supporting the chain C within casing or frame 1 in extended position so as to be readily withdrawn from the casing when desired, it being understood that the spacing and brace strips 4 and 16 and the brackets 5 are provided with suitable offset portions to accommodate the fingers 20 of members 19 when the chain is withdrawn from or inserted into the casing. When not in use, the chain is supported in extended position within casing or frame 1, as illustrated in Figure 4, it being understood that frame 1 is preferably of sufficient length to accommodate the chain when extended to its full length. If it is desired to use a shorter casing or frame 1, the chain C may be accommodated by positioning members 19 closely adjacent to each other permitting the portions of the side chains between the cross-chains to hang down from frame 1 in short loops. An elongated link 21 is provided at one end of each side chain d of chain C, this link being provided with an outwardly projecting lug 22 which fits between the side bars of sections 2 and 3 of frame 1 to support and guide the links in the casing, these lugs corresponding to the members 19 of cross-chains c. A hook member 23 is connected by a link 24 to the other end of side chain d. A securing arm 25 is pivoted at one end on a pin 26 which passes through the arms of link 24, this arm being positioned between the shank of hook 23 and a keeper 27 which is secured to and extends from the inner face of the shank of the hook. The free end portion 25ª of arm 25 is curved downwardly as considered in Figure 8, for a purpose to be described. This arm is provided with an opening 28 positioned to receive finger 29 provided at one end of a locking spring 30 which is secured at its other end to hook 23. The finger passes through an opening provided through the shank of hook 23 for this purpose and is positioned to engage through opening 28 when arm 25 is turned into proper operative position so as to lock the arm against turning movement about pin 26. Hook 23 is further provided, adjacent to bill 23ª thereof with a lug 31 which projects outwardly from the shank of the hook, this lug fitting between sections 2 and 3 of frame 1. Normally the hooks 23 are supported in frame 1 in a horizontal position as in Figure 4. A roller 32 is mounted on pintle 14 of trip member 13, this roller being provided to facilitate movement of the chain into or out of frame 1.

Figures 5, 6:
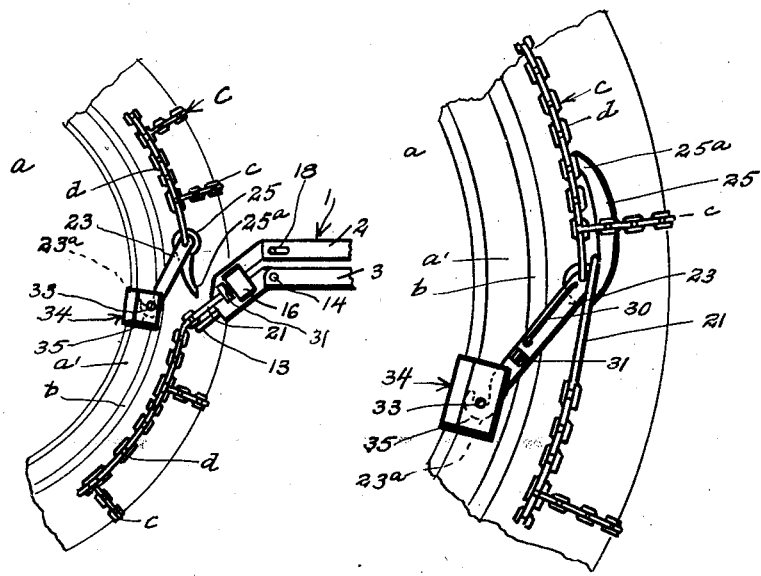
Figure 5 is a fragmentary view showing the manner in which the chain is applied.
Figure 6 is a similar view showing the ends of the chain secured together.
Figure 7:
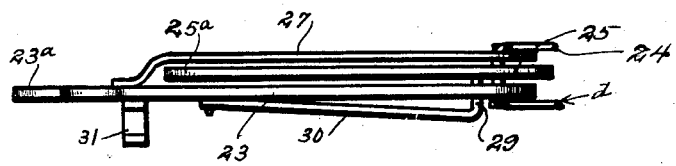
Figure 7 is a top plan view of one of the chain hooks.

Normally the frame 1 is in its forward position with the trip member 13 and member 17 disposed horizontally and in alignment with frame 1. When it is desired to apply the chain to the wheel, frame 1 is moved into its rearward position. This brings the projecting bills 23ª of the hooks 23 into position to be engaged by pins 33 secured in the arms of a substantially U-shaped clip 34 which is secured about felloe a' of wheel a. A confining plate 35 is secured on the outer end of each pin 33 so that the bills 23ª of the hooks, when in engagement with pins 33, are confined between plates 35 and the arms of clip 34. After the pins 33 have engaged into bills 23ª of the hooks, continued rotation of wheel a acts to withdraw the chain from frame 1, the chain being applied about the wheel in a known manner. After the chain has been withdrawn from frame 1 to such an extent that the elongated end links 21 are supported by the members 13 and 17, as in Figure 5, the arms 25 carried by hooks 23, upon continued rotation of the wheel engage through links 21 and loops 15. This action will take place due to the fact that the arms 25 are free to swing about pin 26 independently of hook 23 so that rotation of wheel a will cause the arms 25 to assume substantially the position illustrated in Figure 5, due to centrifugal force. In this connection, attention is called to the fact that finger 29 of spring 30 does not engage into any opening in the arm when the latter is in inoperative position, but this finger presses against the lateral face of the arm and exerts a desirable braking effect which prevents the arm from being thrown outwardly violently when the device is applied. After arms 25 have been inserted through links 21 and loops 15, continued rotation of wheel a causes the arms 25 to contact with the rearward ends of the loops thus swinging or turning arms 25 into the position illustrated in Figure 6, in which position the arm is locked by means of finger 29 of spring 30. This provides very simple and efficient means whereby the chain can be quickly and easily applied to and secured about the wheel of the automobile during travel thereof. When it is desired to remove the chain, arms 25 are released and turned into inoperative position thus releasing links 21 and the chain is replaced within frame 1 by moving links 21 toward the front end of the frame, lugs 22 being inserted between side rails of upper members 2 and 3 of the frame. As will be understood, as the chain is drawn into the frame 1, lugs 19 of the cross-chains are inserted between sections 2 and 3 of the frame and, when hooks 23 are drawn into position between members 13 and 17, lugs 31 are inserted between these members and these lugs coact with the hooks and the chain for normally holding members 13 and 17 in substantially horizontal position. This provides an apparatus of extremely simple construction which may be readily applied to the running board of any automobile of standard construction and by means of which anti-skid chains can be quickly and easily applied to the wheels of the automobile during travel thereof.

In Figures 14 to 16 I have illustrated a modified form of my invention in which the hooks 23 of the chain are replaced by loop members 36. Arms 25 are pivoted in loop members 36, the latter being provided with locking springs 30$^a$ provided with locking fingers similar to fingers 29 which engage into the openings provided in arms 25. Frame 1 is provided with a trip rod 38 secured to this frame and projecting rearwardly therefrom, this rod being provided at its rearward end with a rectangularly disposed finger 38$^a$ which projects inwardly toward wheel $a$. This finger is adapted to contact with the curved end portion 39$^a$ of shank 39 of a hook 40. This hook is rockably mounted on a pin 41 secured in rim $b'$ of the wheel $a$. A stop member 45 is secured on the end of this pin, this member being provided with two angularly related arms 42 and 43 positioned for contact with a lug 44 projecting from shank 39 of the hook member. This hook member fits snugly between the rim and the stop member 45 and is normally held by friction in substantially the position illustrated in Figure 14 with lug 44 in contact with arm 43. Bill 46 of hook 40 is disposed and adapted for engagement through loop member 36 when the frame 1 is moved into its rearward position as in Figures 14 and 15. Movement of frame 1 into its rearward position brings finger 38$^a$ of trip rod 38 into position to contact with the curved end portion 39$^a$ of hook 40. This causes rocking movement of the hook about pin 41, the wheel $a$ being rotated in the direction indicated in Figure 14, bringing the bill 46 of the hook into position for engagement through loop member 36. After the bills of the hooks engage through loop members 36, continued rotation of wheel $a$ serves to withdraw the chain from frame 1 and the curved portions 39$^a$ of the shanks of the hooks pass out of contact with fingers 38$^a$. As will be noted more clearly from Figure 14, the beak of hook 40 flares outwardly, this flare serving to prevent casual disengagement of the hook members from the loop members during continued rotation of the wheel. As will be understood, after the chain has been applied about the wheel arms 25 pass through the end links of the chain in the manner previously described, and these arms are turned into closed or locked position by means of the loops 15 of members 13, in the manner previously described. Movement or travel of arms 25 into contact with loops 15 causes the hook 40 to contact with finger 38 a second time but the hook rocks about pin 41 due to the slack in chain C and readily passes out of contact with finger 38. After arms 25 have been turned into locked or closed position through the end links 21 of chain C, fingers 38$^a$ are positioned above the curved portions 39$^a$ of shanks 39 of hooks 40, after which the wheel $a$ is turned rearwardly as indicated in Figure 15 so as to cause curved portions 39$^a$ of the hooks to contact with fingers 38$^a$ thus disengaging the hooks from loop members 36. After this has been done the frame 1 is returned to its extreme forward or inoperative position.

In Figure 17 I have illustrated a modified form of chain in which the elongated end links 21 are replaced by a rectangular end loop 21$^a$. The operation of this chain is the same as the chain previously described, the arms 25 engaging through the loop 21$^a$.

As will be understood, and as indicated above, changes in construction and arrangement of parts of the invention may be resorted to without departing from the field and scope of the same, and I intend to include all such variations, as fall within the scope of the appended claims, in this application in which a preferred form only of my invention is disclosed.

What I claim is:—

1. In combination with an automobile, a supporting frame slidably mounted on the running board of the automobile for movement toward and away from the rear wheel of the automobile, an anti-skid chain slidably mounted in the frame, co-operating means carried by the chain at one end thereof and the wheel for withdrawing the chain and applying it about the wheel during rotation thereof when the frame is in its rearward position, co-operating means carried by the first mentioned means and the chain at the other end thereof for securing the ends of the chain together, and means carried by the frame for moving the second mentioned means into operative position.

2. In combination with an automobile, a frame slidably mounted for movement toward and away from the rear wheel of the automobile, an anti-skid chain supported within the frame, attaching members carried by the chain at the rearward end of the frame and projecting beyond the latter, members carried by the wheel and disposed for engagement with said attaching members when the wheel is rotated and the frame is in its rearward position for withdrawing the chain and applying it about the wheel, securing members carried by said attaching members, members carried by the chain at the other end thereof and adapted for reception of the securing members, means carried by the frame at the rearward end thereof for supporting the members at said other end of the chain in position for reception of the securing members and for turning the securing members into operative position, and means carried by said attaching members for locking the securing members in operative position.

3. In combination with an automobile, a frame slidably mounted for movement toward and away from the rear wheel of the automobile, an anti-skid chain supported within the frame, hook members carried by the chain at the rearward end of the frame, securing arms carried by the hook members, securing members carried by the chain at the other end thereof and adapted for reception of said arms, members carried by the frame at the rearward end thereof for supporting said securing members in position for reception of the securing arms, the members carried by the frame being positioned, when the frame is in its rearward position, to contact with said arms and turn the same into operative position, members carried by the wheel and positioned for engagement with said hook members, and means carried by the hook members for securing the locking arms in operative position.

4. In combination with an automobile, a frame supported for movement toward and away from the wheel of the automobile, an anti-skid chain slidably supported in said frame, hook members carried by the chain at the rearward end of the frame, hook engaging members carried by the wheel and disposed for engagement with said hook members to withdraw the chain from the frame and apply it about the wheel during rotation thereof when the frame is in its rearward position, said frame being provided at its rearward end with a hinged portion, elongated links carried by the chain at the other end thereof, the hinged portion of the frame being provided with loops, locking arms carried by the hook members and adapted to pass through the links when the chain has been applied about the wheel, said loop members being positioned to accommodate said arms and to turn the same into operative position for securing the ends of the chain together, and means for locking said arms in operative position.

5. In combination with an automobile, a frame slidably mounted for movement toward and away from the automobile wheel, said frame including an upper section and a lower section disposed in spaced relation, an anti-skid chain provided with members fitting between the sections of the frame and supporting the chain within said frame so as to be readily withdrawn therefrom, hook members carried by the chain at the rearward end of the frame, hook engaging members carried by the wheel and disposed to engage said hook members when the frame is in its rearward position and the wheel is rotated, co-operating means carried by the chain at the other end thereof and by the hook members for securing the ends of the chain together after it has been applied about the wheel, means carried by the frame for moving said securing means into operative position, and means for locking the securing means in operative position.

6. In combination with an automobile, a frame mounted for movement toward and away from the wheel of the automobile, an anti-skid chain slidably supported within said frame so as to be readily withdrawn therefrom, hook members carried by the chain at the rearward end of the frame, hook engaging members carried by the wheel and disposed to engage said hook members when the frame is in its rearward position so as to withdraw the chain and apply it about the wheel when said wheel is rotated, and co-operating means carried by the hook members and the other end of the chain and actuated by the frame for securing the ends of the chain together after the chain has been applied about the wheel.

7. In combination with an automobile, a frame mounted for movement toward and away from the wheel of the automobile, an anti-skid chain slidably mounted within the frame, loop members carried by the chain at the rearward end of the frame, hook members mounted on the wheel, tripping means for moving the hook members into position to engage with the loop members when the wheel is rotated in normal direction and the frame is in its rearward position, co-operating means carried by the chain at the other end thereof and by the loop members and actuated by the frame for securing the ends of the chain together when the chain has been applied about the wheel, said tripping means and the hook members co-operating to disengage the hook members from the loop members upon reverse rotation of the wheel through a predetermined distance after the ends of the chain have been secured together.

8. In combination with an automobile, a frame including upper and lower sections supported in spaced relation, an anti-skid chain positioned within the frame and provided at its opposite sides with members projecting through the spaces between the sections and slidably supporting the chain so as to permit ready withdrawal thereof from the frame, hook members carried by the chain at the rearward end of the frame, hook engaging members carried by the wheel and positioned to engage with said hook members when the frame is in its rearward position and the wheel is rotated, elongated links carried by the chain at the other end thereof, said frame being provided at its rearward end with a hinged section, locking arms carried by said hook members and adapted for engagement through said links, the hinged sections of the frame being provided with loops positioned to accommodate said arms and to turn the same into operative position when the chain has been applied about the wheel, and means for securing said arms in operative position.

In testimony whereof I affix my signature.

LEON C. MAMAUX.